(12) United States Patent
Carter, Jr. et al.

(10) Patent No.: US 6,211,462 B1
(45) Date of Patent: Apr. 3, 2001

(54) LOW INDUCTANCE POWER PACKAGE FOR INTEGRATED CIRCUITS

(75) Inventors: Buford H. Carter, Jr., Richardson; Dennis D. Davis, Garland, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/434,867

(22) Filed: Nov. 4, 1999

Related U.S. Application Data

(60) Provisional application No. 60/107,224, filed on Nov. 5, 1998.

(51) Int. Cl.[7] .................................................. H01L 23/02
(52) U.S. Cl. ......................... 174/52.4; 257/666; 257/676
(58) Field of Search ................................ 257/732, 734, 257/676, 774, 666; 174/52.4

(56) References Cited

U.S. PATENT DOCUMENTS

| | | | |
|---|---|---|---|
| 5,479,050 | * 12/1995 | Pritchard et al. | 257/676 |
| 5,594,234 | * 1/1997 | Carter, Jr. et al. | 257/676 |
| 5,663,597 | * 9/1997 | Nelson et al. | 257/676 |

* cited by examiner

Primary Examiner—Shawn Riley
(74) Attorney, Agent, or Firm—Gary C. Honeycutt; Fred Telecky; Arthur I. Navarro

(57) ABSTRACT

The invention provides a low inductance semiconductor package for RF circuits having a flat leadframe with internal leads formed upward to be in very close proximity to the die mount pad. The die mount pad is exposed through the package backside and serves both as a ground plane and as a heat spreader. The external leads are flat and extend beyond the package edge so that good solder connections to a printed wiring board can be made and inspected. The lead tips exposed beyond the package further provide a position for mold clamping and for test probing the device.

20 Claims, 5 Drawing Sheets

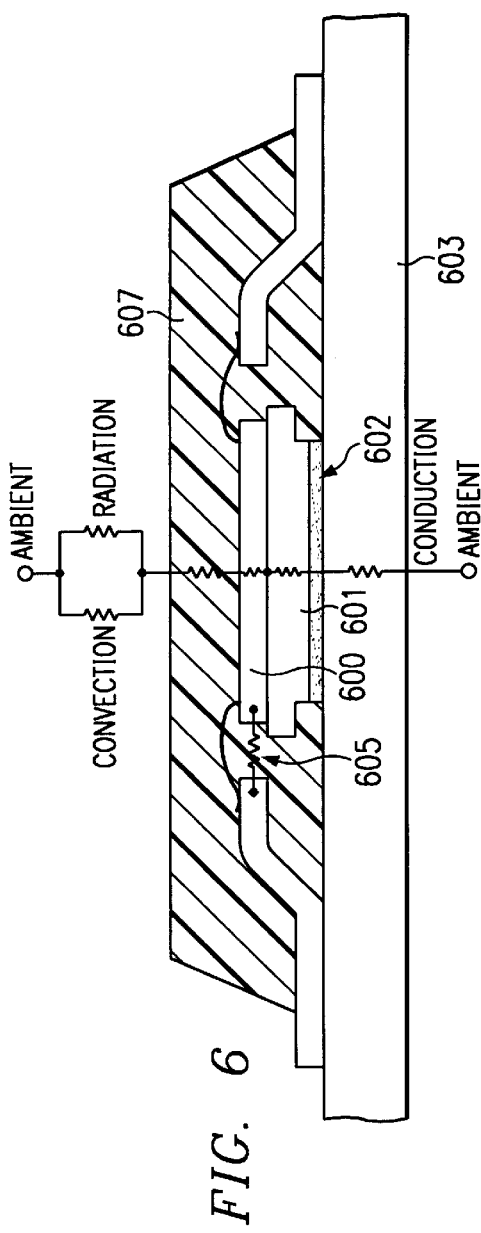
FIG. 6
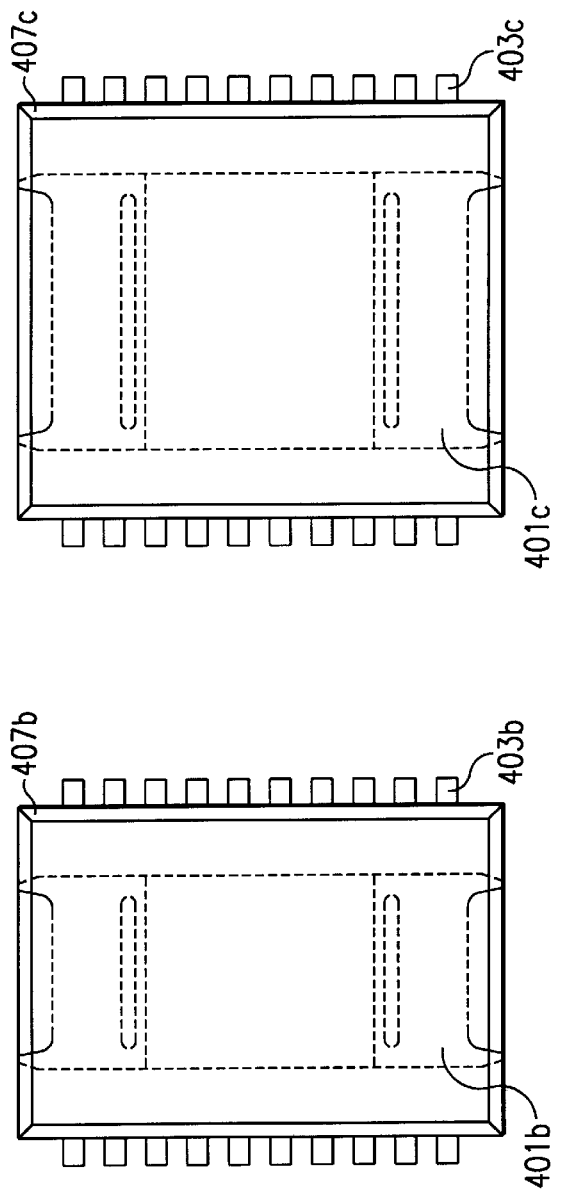
FIG. 7a
FIG. 7b
FIG. 7c

LOW INDUCTANCE POWER PACKAGE FOR INTEGRATED CIRCUITS

This application claims benefit of Provisional Appl. No. 60/107,224, filed, Nov. 5, 1998.

CROSS REFERENCE TO APPLICATIONS

This application is related to U.S Pat. No. 5,594,234 granted on Jan. 14, 1997 and to U.S. Pat. No. 5,663,597 granted on Sep. 2, 1997.

FIELD OF THE INVENTION

This invention relates to semiconductor devices, more particularly to packaging of semiconductor devices, and more particularly to a package having low lead inductance.

BACKGROUND OF THE INVENTION

High frequency telecommunications semiconductor devices for low impedance RF transmission circuits require very low inductance interconnections between the chip and the circuit board. Frequently, integrated circuits designed for these applications are also relatively high power devices. Semiconductor devices that dissipate high power, or are used in high frequency telecommunications, are usually packaged with a heat sink to dissipate heat produced by the device and to provide a RF ground plane for the device. The heat sink is positioned close to or against the semiconductor device and is encapsulated within the device package with one surface of the heat sink exposed through the package encapsulant. The addition of a heat sink along with a lead frame requires additional components, additional assembly steps, and additional equipment, thereby increasing the cost of the device.

Previously, packages for RF transmission circuits included hermetic packages for military application, and more recently packages having the die mount pad of the leadframe exposed through the plastic encapsulant, or having a custom leadframe with wide ground connections. The latter packages make attempts to compensate for the shortcomings of known high frequency and/or high power packages, and have been disclosed in U.S. Pat. No. 5,594,234 issued Jan. 14, 1997 and U.S. Pat. No. 5,663,597 issued on Sep. 2, 1997.

In high frequency applications the semiconductor package has the greatest influence on total performance of the circuit, and one of the main causes of performance degradation is inductance of the interconnections between chip and printed wiring board. Therefore, as the operating frequency of these circuits increases there is a need for even lower inductance packages, some of which may require less than 50 ohms matched impedance.

SUMMARY OF THE INVENTION

It is a primary object of the present invention to provide a novel packaging structure for integrated circuits having very low inductance and an RF ground plane. The above and other objects, features and advantages will be apparent from the following descriptions.

It is further an object of the invention that the package design is readily expandable to families of packages having common design features rather than customized packages.

Still further, an object of the current invention is to provide a package having high thermal dissipation.

It is also an object of this invention that the package be small, and be near chip sized. While the package will consume a minimal amount of board space, it is an object of the invention that leads external to the package be designed to allow inspection of solder joints after been soldered to a printed circuit board.

Another object of the current invention is that the package be constructed of low cost materials, and low cost assembly processes, in order to meet the cost requirements of the consumer market. It is an object of the invention that the package be reliable, and easily manufactured.

It is an object of the invention that the inductance and thermal objectives of the package be met without the need for additional components, such as in-package capacitors.

The above objectives are met by a packaging structure wherein the die is mounted on a flat, relatively thick, non-magnetic leadframe having a die mount pad which is exposed through the under side of the package. The lead tips inside the package are elevated in order to be in very close proximity to bond pads on the die, and thereby minimizing the length of bond wire necessary to connect bond pads to leads. The external lead tips are parallel to the die mount pad and extend beyond the package edge, so that solder connections can be easily inspected after the package has been assembly onto a printed wiring board.

Features are included in the leadframe design to support locking of the encapsulating mold compound to the leadframe, and to support heavy clamping of the mold in order to avoid flashing or bleed of the plastic onto the leads and exposed die mount pad.

A family of package designs for rectangular dual lead small outline packages, as well as a family of 16 through 40 pin square or quad surface mount packages are disclosed as exemplary; however the invention is not limited to these package families or types.

The package construction on the top side of the leadframe allows a simple mold design requiring no intermeshing of the plastic above and below the leadframe. In further support of low cost assembly objectives, straight external leads require no forming operation or equipment. In addition, the packages are designed for "in line" handlers, and thereby avoid the need for slow, high cost pick and place equipment.

The drawings constitute a part of this specification and include exemplary embodiments of the invention which may be embodied in various forms. It is to be understood that in some instances aspects of the invention may be shown exaggerated or enlarged to facilitate understanding of the invention.

BRIEF DESCRIPTION OF THE DRAWINGS

FIG. 6 depicts heat flow paths of a low inductance package of the current invention.

FIGS. 7(a)–7(c) show an exemplary family of low inductance dual lead rectangular packages of the current invention.

DETAILED DESCRIPTION OF THE INVENTION

Figure 1A:
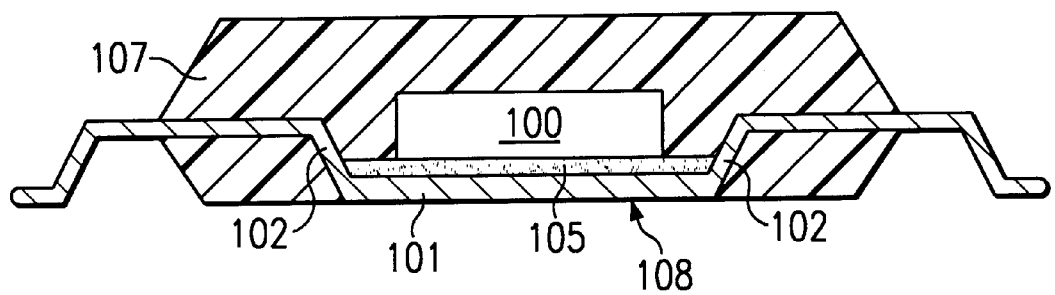
FIG. 1a shows a cross sectional view of a downset exposed die mount pad package.(Prior art).

FIG. 1a shows a cross section of a previously disclosed downset lead frame package having an exposed die mount pad which may serve both as a heat sink to the board, and as an RF ground connection. This package is disclosed in U.S. Pat. No. 5,594,234. The entire disclosure of which is incorporated herein by reference. In FIG. 1a, an end view of the package shows a semiconductor chip 100 attached to a die mount pad 101 which has wings 102 connected to selected leads 104 of the package. A conductive material 105 secures the chip and transfers heat from the chip 100 to a die mount pad 101. Bond pads on the active surface of the chip are connected to leads internal to the package by wire bonds 106. The assembled chip and internal leads are encapsulated in a molding compound 107 except on the backside of the die mount pad 108 which is exposed and may be attached to the circuit board for thermal dissipation and ground contact.

Figure 1B:
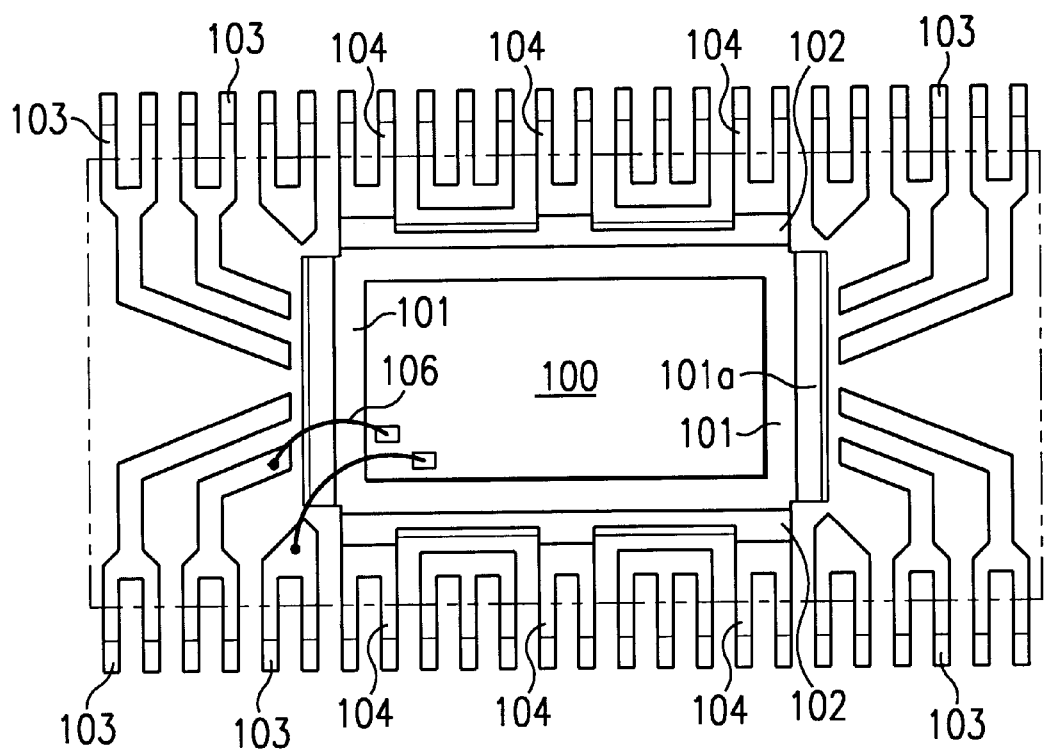
FIG. 1b shows the top view of a downset exposed die mount pad package. (Prior art)

To further explain, a top view of the leadframe is shown in FIG. 1b. The chip 100 is attached to the mount pad 101 which has wings attached to selected leads 104; further the mount pad is formed upward at the ends 101a to form a moisture path. While this package has thermal and ground advantages over more conventional semiconductor package designs, it is not optimized for low inductance.

Figure 2A:
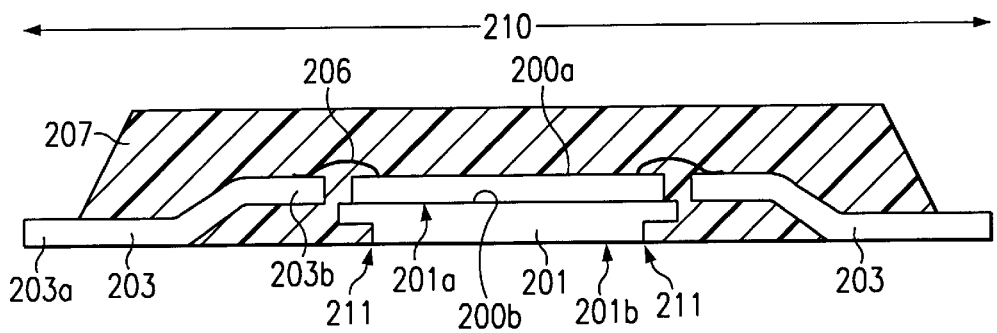
FIG. 2a shows a cross sectional view of 24 pin dual lead rectangular low inductance package of the current invention.

A cross sectional view of the low inductance package 210 of the current invention, having lead inductance of less than one nanohenry per lead is shown in FIG. 2a. In contrast to the downset leadframe package of FIG. 1, this package 210 has a relatively thick leadframe with flat external leads 203a, and the encapsulant 207 is located in the plane of and above the leadframe. The leadframe includes a plurality of leads 203, and a die mount pad 201 which is exposed through the back of the package at point 211. The exposed die mount pad 201 when attached to a circuit board by the user, and can serve both as an excellent heat sink, and as a RF ground plane. It can be seen in FIG. 2b that the die mount pad 201 extends the full length of the package, as opposed to more typical die mount pads which extend approximately the length of the chip. The long, thick pad provides an improved ground and thermal support to the circuit. In addition, the exposed ends are readily accessible for inspection of the solder reflow quality after board attachment, and provide a location for clamping the mold during encapsulation of the package which supports prevention of mold flash on exposed leads.

Leads internal 203b to the package are sloped upward to near chip height. The external leads 203a are flat, and are parallel to the die mount pad and to the bottom of the package. The package 210 houses a semiconductor chip 200 having a first major surface 200a with bonding pads and active circuitry, and a second major surface 200b which is attached to a first or upper surface 210a of the die mount pad. The active surface 200a of the chip is on the same plane as the internal bond tips 203b so that wire bonds 206 span the shortest-possible distance.

Figure 3:
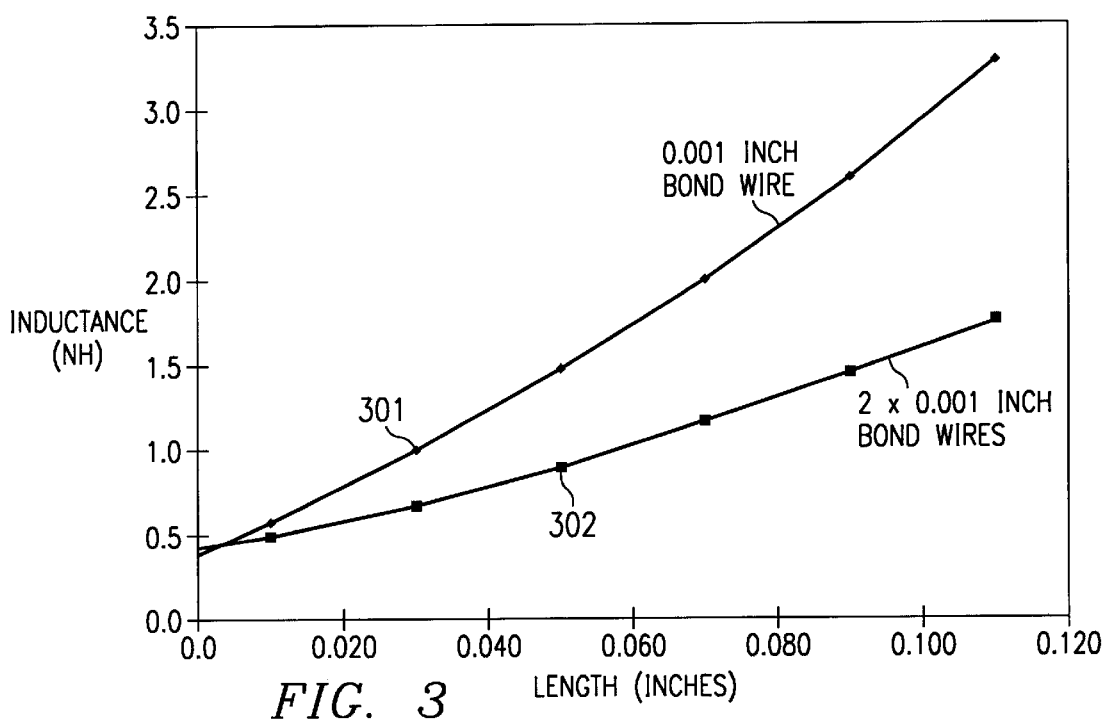
FIG. 3 provides a chart of inductance vs wire length and the effect of a single vs two wires.

Minimizing interconnection length is of the greatest importance for a low inductance packaging. Thin bond wires, typically in the range of 0.0006 to 0.0013 inches in diameter are a major source of inductance, and in order to minimize wire length and to optimize package inductance, it is necessary to place the lead tips as close as possible to the on chip bond pads. FIG. 3 provides a chart of calculated inductance values versus length and one vs two bonding wires. It can be seen that lead inductance can be held to about 1 nanohenry only when the wire length is controlled to about 0.030 inches with standard 0.001 inch gold wire bond at point 301 on the chart, or controlled to about 0.050 inches (302) with two wire bonds of 0.001 inches diameter are used. Because bond pad sizes are shrinking, it is not always possible to use thick or multiple wires and therefore, the better option is to minimize wire length as much as possible. In conventional packaging, lead tips are above or below the level of the chip surface, and longer wires are required to connect the bond pads and lead tips, whereas in the current invention very short wires are possible.

Bond pads of chip interconnections requiring very critical inductance values are located parallel to their respective bond fingers in order to provide short and straight connections, and thus minimize inductance.

Inductance of the interconnection is decreased by increased thickness of non-magnetic materials, and by minimizing the length of electrical interconnections. In order to achieve very low inductance, it is necessary to minimize the space between chip bond pads and lead tips, as well as to provide short, thick leads. However, as the thickness of the leadframe is increased, the minimum space between parts of the leadframe which is manufacturable by the lead frame supplier is restricted because the smallest spacing between different parts of a leadframe, such as lead to lead, or lead to die mount pad is a function of the material thickness. Further, with thick leadframe material, it becomes difficult to form leads tips in close proximity to the die mount pad.

In the low inductance package 210 of this invention, the lead frame material thickness has been reduced by about 60–70% in the back side area from the lead tips to an indented area under the die pad. The area with thinner material provides a manufacturable design having a smaller space between the lead tips and die pad. As a result of the selectively thinned lead frame material in this invention, space between die mount pad and lead tips can be narrowed to about one-half of the thickness of the original leadframe material, thereby supporting very short bond wires. A further advantage of the indentation in the die pad provides a means of mold locking and a barrier against moisture ingress.

In addition, by forming the leads to exit the bottom of the package, short lead lengths with resulting lower inductance of interconnections between the chip and the external circuit are accomplished. The external leads 203a extend a short distance outside the package edge. The exposed leads provide advantages in clamping the leads to control mold flashing, in improving solder fillets and inspection and in providing a position for test probing the device.

Figure 4A:
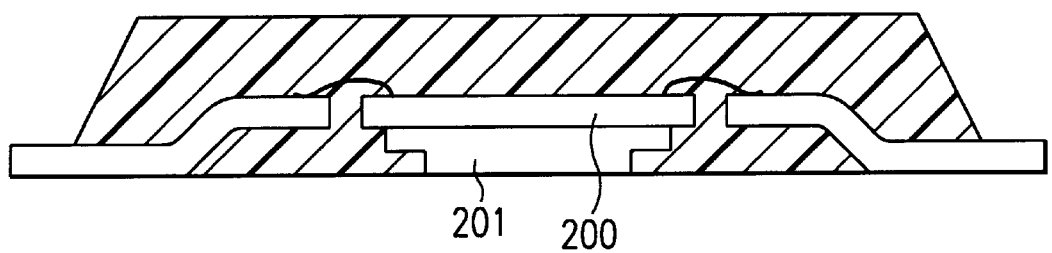
FIGS. 4a and 4b show detailed views of die mount pad and die placement options.
Figure 4B:
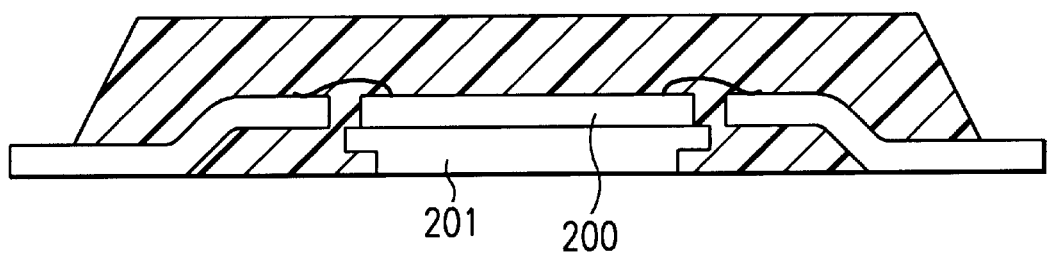

In closer detail, options for placement of the die to mount pad and to lead fingers are given in FIGS. 4a and 4b. It can be seen that in order to minimize the lead wire inductance, the chip 200 may be placed near the die mount pad edge 201 and within the pad area as in FIG. 4b, or the chip 200 may overlap the pad 201 as in FIG. 4a. These options are provided as a means to minimize wire lengths, but it is generally preferred to support the more brittle silicon chip by placing within the pad area, and the location as shown in FIG. 4b is the preferred embodiment of the current invention.

In prior art, as a means to effect impedance matching and to compensate for mismatches, chip capacitors have been placed inside the package and the chip wire bonded to the capacitor and the capacitor to the leads. Because of the low inductance of the package of this invention circuit losses are minimized the need for such additional components in the packages can be avoided.

Returning now to FIG. 2b, it can be seen that not only are the internal lead tips 203b spaced in close proximity to the die pad 201 to minimize the bond wire lengths, but the entire leads 203 are parallel to each other, are straight, and are confined within the smallest area possible to minimize the total lead inductance.

Figure 2B:
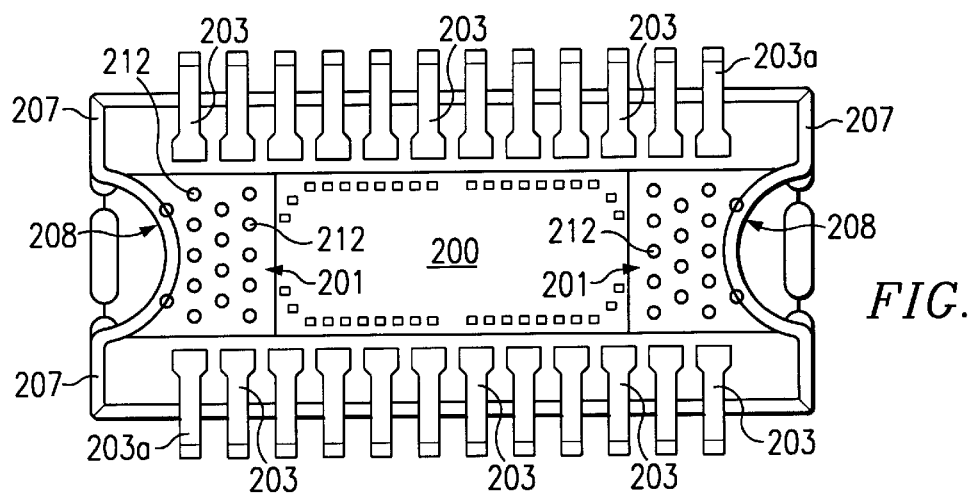
FIG. 2b shows exposed top view of the low inductance package of the current invention.

Further, from FIGS. 2a and 2b, it can be seen that in order to provide the lowest inductance, the leads exit the package bottom in order to provide the shortest lead length to land positions on the receiving printed circuit board. The external leads 203a exit the package parallel to the package bottom as flat leads which require no additional bending or forming, as is typical of more conventional leadframes which exit the center of the package.

Figure 5:
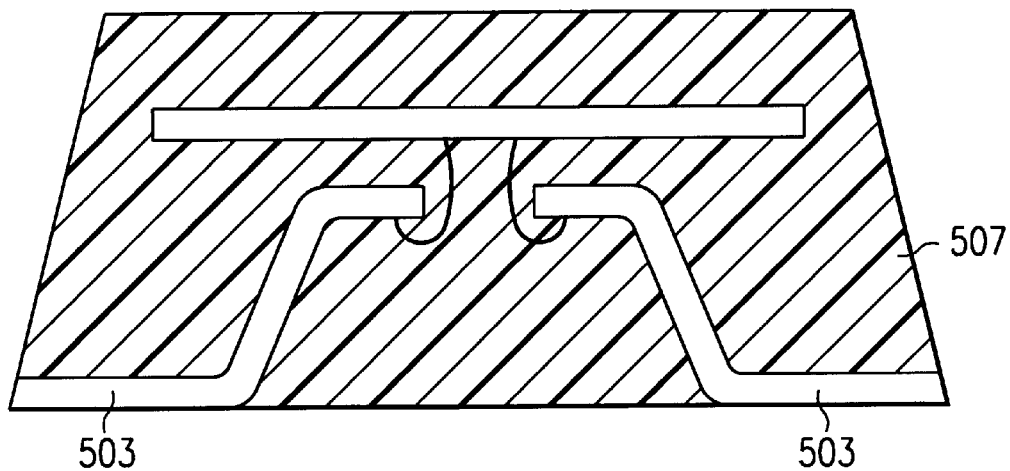
FIG. 5 shows a cross sectional view of a package with bottom exit leads. (Prior art)

The ends of the external leads 203a extend about 0.020 inches beyond the plastic encapsulant 207 so that good solder fillets may be formed and the solder joints may be inspected after the package has been soldered to a printed wiring board. This inspection feature is in contrast to a previously disclosed Lead-on-Chip package as shown in FIG. 5 having flat lead ends 503 which are parallel to the surface of the package 507 so that they may be soldered directly to a printed circuit board. However, these external lead tips are within the package area, and thus are completely obscured by the package itself from inspection.

Addition advantages of flat lead tips extending outside the package edge are that a position for clamping the mold is provided which in turn minimizes mold flashing and contamination of the leads. Further, the exposed leads provide a position for test probing the device.

In the current invention, a plastic molding compound 207 encapsulates the package only in and above the plane of the leadframe and die mount pad, as shown in FIG. 2a. This is in contrast to more conventional packages having a leadframe surrounded by encapsulation, and which requires that molds above and below the leadframe be intermeshed. The simpler molds required for the low inductance package of this invention provides a significant cost advantage over more conventional molded packages.

Relatively thick, flat leads extending outside the package area provide a location to clamp the mold during the encapsulation process. In addition, indentations 208 in the mold at either end of the package provide for locations to clamp the mold on the die mount pad. These features provide rigid clamping and facilitate molding of the package with little resin bleed, thereby eliminating the need for cleaning or deflashing the exposed leads and die mount pad after encapsulation.

In conventional surface mount plastic packages leads external to molded plastic are trimmed from the a leadframe transport rail after molding, and the leads are formed so that they may contact and be soldered to a printed circuit board. The forming operation is critical because it is possible to damage the plastic molding compound and compromise the integrity of the seal between leadframe and plastic. This operation requires a precision set of forming tools which are expensive to fabricate. However, with the flat leads of the low inductance package of the current invention, any need for lead forming after molding is eliminated.

The total package thickness of the preferred embodiment is about 1 mm or 0.040 inches and the leadframe is about 0.010 inches thick. The relatively thick leadframe material supports fabrication of features to lock or enhance adhesion of the encapsulating plastic. In FIG. 2b, mechanical features 212, such as indentations on the upper surface of either end of the die mount pad can be seen which allow the molding compound to be locked to the leadframe. The indentations not only enhance adhesion, but create longer paths for ingress of moisture or other contaminants into the package. Irregularities on the sides of the leads (not shown) are a result of the metal etching process further enhance locking of the plastic. A third encapsulation locking feature is a result of the die mount pad design. The notch or inset of the mount pad provides that the bottom surface 201b is smaller than the upper surface 210a, thereby allowing a locking feature resulting from the perimeter inset. These locking features are more difficult to define or are less pronounced with thinner leadframe material, than with the relatively thick material of the present invention thick.

Thick leadframe material, thin package body and close spacing of the lead tips to die mount pad of the package of this invention contribute to providing an excellent package for dissipating heat from the chip. Thermal resistance networks depicted in FIG. 6 demonstrate primary heat flow paths by conduction from the die 600 through the die mount pad 601, which in turn is soldered 602 to a circuit board 603 which acts like a heat sink. In addition, the small space between die and leads at point 605 and through the leads to a heat sinking board provides a heat dissipation path. In addition, the thin package encapsulation 607 supports convection and radiation of heat into the ambient from the package surface.

The preferred embodiment of current invention is a rectangular package about 1 mm or 0.040 inches in thickness. In this embodiment, the chip thickness is in the range of 0.008 to 0.015 inches, and the lead frame material is also in the range of 0.008 to 0.015 inches. The die mount pad has an first surface 201a which is in contact with the chip backside 200b, and a second surface 201b which is exposed from the package and can serve both as a heat sink and as an RF ground plane. Thickness of the die mount pad at the perimeter is decreased by about one-half of the material thickness from the backside, and the depth of the indention is also about one-half of the material thickness. Lead tips internal to the package are spaced about one half of the leadframe material thickness, or in the range of 0.004 to 0.008 inches from the die mount pad. The external leads are parallel to the package and extend about 0.020 inches beyond the package edge. The leads internal to the package are sloped upwards so that the lead tips are approximately parallel with the chip bonding pads. The chip is located within the area of the die mount pad.

From FIGS. 7(a)–7(c), it can be seen that the low inductance package of this invention is amenable not just to a single package geometry, but to other embodiments in a family, or group of related rectangular packages. In FIGS. 7(a)–7(c), 24 dual lead packages with die mount pads and body widths a, b and c are shown as exemplary, but the invention is not limited to 24 pins or to the exemplary package widths. Either, or both the number of leads and the width of the package can be changed, but the geometric features critical to the low inductance package of this invention are maintained. Those critical features include a relatively thick leadframe having a die mount pad 401, 401b or 401c which is exposed from the package backside, and which is in very close proximity to the internal lead tips so that bond wire lengths can be as short as possible. The perimeter of the die mount pad is indented to about one-half of the thickness of the leadframe material which allows the lead tips to be formed upward and to be spaced less than the leadframe material thickness from the die mount pad. To minimize lead inductance, the leads are straight, parallel, and provide the shortest possible distance to the circuit board lands by exiting the package bottom. On chip bond pads requiring critical inductance values are located parallel to their respective bond fingers in order to provide short and straight connections and thus minimize inductance. External leads 403, 403b and 403c exit the package bottom, are parallel to the die mount pad, are flat, and extend beyond the package edge. The packages 407, 407b and 407c are encapsulated in plastic molding compound in the plane of, and above the die mount pad and external leads. These features support low cost molding and forming equipment, as well as lower cost "in-line" handling equipment.

Figure 8:
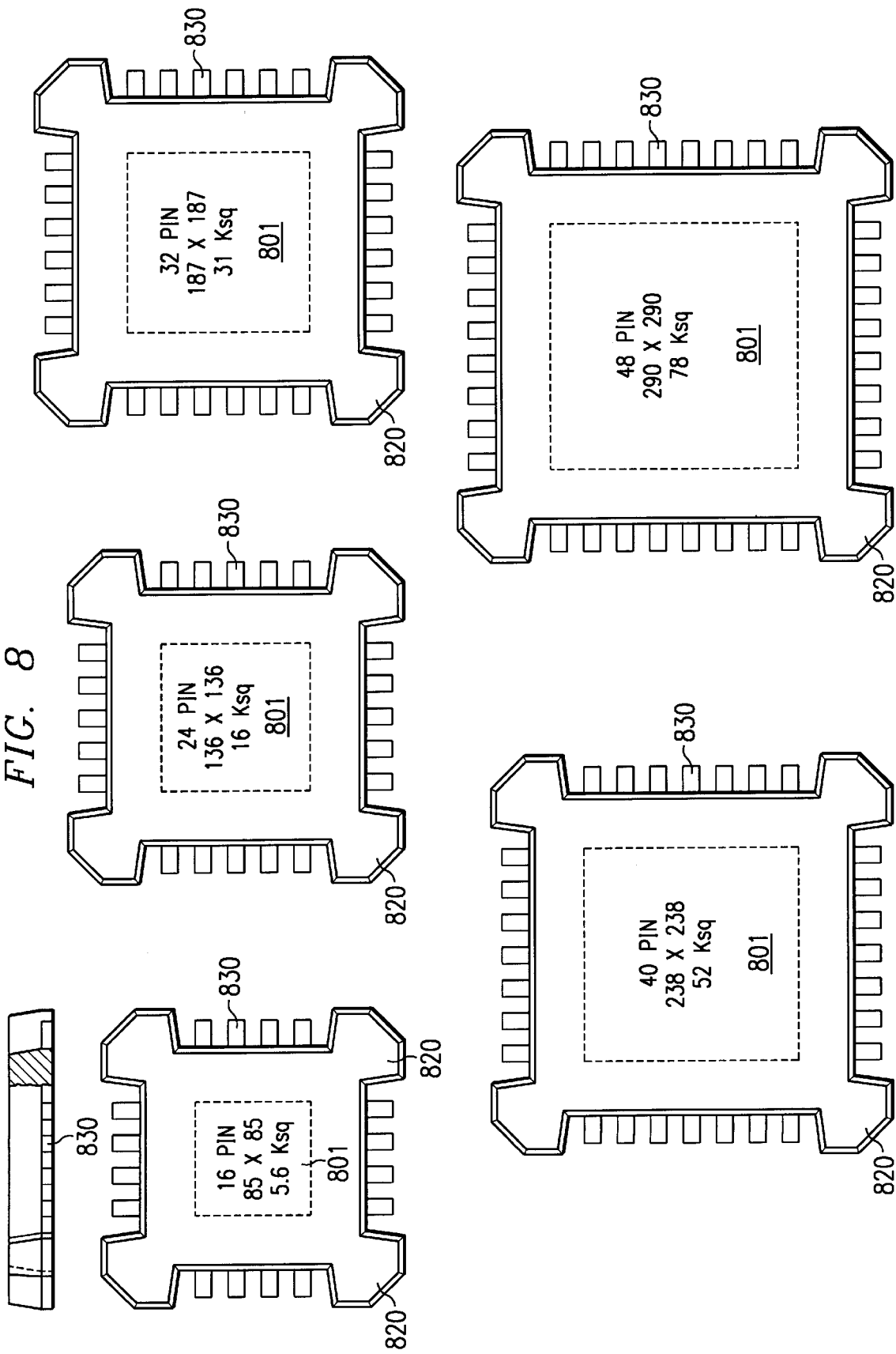
FIG. 8 shows an exemplary family of low inductance square or quad flat packages of the current invention.

In yet another embodiment, shown in FIG. 8 families of square or quad surface mount packages are provided. The package size and pin count included in FIG. 8 as exemplary are 16 through 48 leads, but the invention is not limited to these sizes. The pertinent features for the low inductance package are included in this embodiment. Those features include a relatively thick lead frame having a die pad 801 which is exposed through the bottom of the package to provide heat sinking as well as an available RF ground plane. Further, the die mount pad is thinned at the perimeter to one-half of the material thickness which in turn allows the internal lead tips to be sloped upward and to within one-half of the leadframe material thickness from the die mount pad. The resulting short distance allows very short bond wires to interconnect the chip bond pads to internal lead tips. The leads are straight and parallel in order to avoid additional length and contribution to inductance. Flat external leads 830 are in the same plane as the die mount pad, and extend beyond the package edge. The molded body of the packages include a "bumper" 820 on each corner which extends slightly beyond the tips of the leads 830 and protects the lead tips from damage during handling. The corner bumpers 820 allow the use of "in-line" handling equipment as opposed to more expensive and slower pick and place equipment typically used with quad surface mount packages. These features support low cost molding, forming and "in-line" handling equipment.

While the invention has been described in connection with preferred embodiments, it is not intended to limit the scope to a particular form set forth, but on the contrary, it is intended to cover alternatives, modifications and equivalents as may be included within the spirit of the invention and scope of the invention as defined by the appended claims.

What is claimed is:

1. A surface mount semiconductor package including:
 a) a relatively thick leadframe having a plurality of leads and a die mount pad, said mount pad including a first surface to which a chip is attached, a second surface which is exposed through the package bottom, and the perimeter having an indentation wherein the thickness of the pad above the indentation is about one-half of the thickness of the leadframe material; said plurality of leads having a portion interior to the package sloped upward to terminate in close proximity to said die mount pad, and an exterior portion which is flat and in the same plane as the die mount pad;
 b) relatively short bonding wires interconnecting the chip bond pads to said leads internal to the package; and
 c) a molded plastic encapsulation in the plane of and above the leadframe.

2. A semiconductor package as in claim 1 wherein said indentation in the mount pad is on the bottom or second surface and extends inward by about one half of the material thickness.

3. A semiconductor package as in claim 2 wherein said indentation in the die mount pad provides a mechanism for securing the encapsulating plastic to the lead frame.

4. A semiconductor package as in claim 1 wherein the external leads extend beyond the package edge in the range of 0.015 to 0.030 inches.

5. A semiconductor package as in claim 4 wherein the external leads provide a location for clamping a mold.

6. A semiconductor package as in claim 1 wherein the leads are horizontally straight and parallel to each other.

7. A semiconductor package as in claim 1 wherein the distance between the internal lead tips and die mount pad is less than the thickness of the leadframe material.

8. A semiconductor package as in claim 1 wherein the inductance between each bond pad on the semiconductor chip and the external lead is less than 1 nanohenry.

9. A semiconductor package as in claim 1 wherein the die mount pad provides a direct heat path to the semiconductor chip.

10. A semiconductor package as in claim 1 wherein the die mount pad provides a ground plane.

11. A semiconductor package as in claim 1 wherein the leadframe comprises a non-magnetic material.

12. A semiconductor package as in claim 1 wherein said die mount pad extends the full length of the package.

13. A semiconductor package as in claim 12 wherein said die mount pad has mechanical features for locking the encapsulating plastic to said pad.

14. A semiconductor package as in claim 12 wherein said die mount pad provides locations for clamping a mold at both ends of the package.

15. A package as in claim 1 wherein said package is a small outline package.

16. A surface mount semiconductor package including:
 a) a relatively thick leadframe having a plurality of leads and a die mount pad which is exposed through the bottom of the package to provide a ground plane and a direct heat path to the semiconductor chip, said mount pad including a first surface to which a chip is attached, a second surface which is exposed through the package bottom, and the perimeter having an indentation wherein the thickness of the pad above the indentation is about one-half of the thickness of the leadframe material; said plurality of leads having a portion interior to the package sloped upward to terminate in close proximity to said die mount pad, and an exterior portion which is flat and in the same plane as the die mount pad;
 b) relatively short bonding wires interconnecting the chip bond pads to said leads internal to the package;
 c) a molded plastic encapsulation in the plane of and above the leadframe;
 d) said external leads extend beyond the package edge in the range of 0.015 to 0.030 inches;
 e) said plurality of leads are horizontally straight and parallel to each other; and
 e) each interconnections between the semiconductor chip bond pad and external leads is less than 1 nanohenry.

17. A family of dual lead rectangular semiconductor packages, each of which includes:
 a) a relatively thick leadframe having a plurality of leads and a die mount pad, said pad includes a first surface to which a chip is attached, a second surface which is exposed through the package bottom, and the perimeter of said pad is about one half of the thickness of the leadframe material, and said plurality of leads having a portion interior to the package formed upward to be in close proximity to said die pad, and an exterior portion which is flat and in the same plane as the die mount pad;

b) relatively short bonding wires interconnecting the chip bond pads to said internal leadframe tips; and c) a molded plastic encapsulation in the plane of and above the leadframe.

18. A family of dual lead rectangular surface mount semiconductor packages as in claim 17 wherein the die mount pad of each of provides a ground plane and a direct heat path to the semiconductor chip and the inductance of each lead is less than one nanohenry.

19. A family of square surface mount packages, each of which includes:

a) a relatively thick leadframe having a plurality of leads and a die mount pad, said pad includes a first surface to which a chip is attached, a second surface which is exposed through the package bottom, and the perimeter of said pad is thinned, and said plurality of leads having a portion interior to the package formed upward to be in close proximity to said die pad, and an exterior portion which is flat and in the same plane as the die mount pad;

b) relatively short bonding wires interconnecting the chip bond pads to said internal leadframe;

c) a molded plastic encapsulation in the plane of and above the leadframe; and d) a molded bumper on each corner of the package extending slightly beyond the lead ends.

20. A family of square surface mount semiconductor packages as in claim 17 wherein the die mount pad of each of provides a ground plane and a direct heat path to the semiconductor chip, and the inductance of each lead is less than one nanohenry.

* * * * *